(12) United States Patent
Hallundbæk

(10) Patent No.: US 11,312,279 B2
(45) Date of Patent: Apr. 26, 2022

(54) BUS STRUCTURE WITH A VERTICAL HANDLE FOR PASSENGERS

(71) Applicant: Alpha EC Industries 2018 S.à r.l., Luxembourg (LU)

(72) Inventor: Jørgen Hallundbæk, Luxembourg (LU)

(73) Assignee: ALPHA EC INDUSTRIES 2018 S.À.R.L., Luxembourg (LU)

( * ) Notice: Subject to any disclaimer, the term of this patent is extended or adjusted under 35 U.S.C. 154(b) by 102 days.

(21) Appl. No.: 16/600,626

(22) Filed: Oct. 14, 2019

(65) Prior Publication Data

US 2020/0114796 A1     Apr. 16, 2020

(30) Foreign Application Priority Data

Oct. 15, 2018 (LU) .................................... 100962

(51) Int. Cl.

| | |
|---|---|
| *B60N 3/02* | (2006.01) |
| *B60N 2/24* | (2006.01) |
| *B62D 21/03* | (2006.01) |
| *B62D 31/02* | (2006.01) |
| *B62D 47/02* | (2006.01) |

(52) U.S. Cl.
CPC .............. *B60N 3/02* (2013.01); *B60N 2/242* (2013.01); *B62D 21/03* (2013.01); *B62D 31/02* (2013.01); *B62D 47/02* (2013.01)

(58) Field of Classification Search
CPC .......... B60N 3/02; B60N 2/242; B62D 21/03; B62D 21/02; B62D 47/02
See application file for complete search history.

(56) References Cited

U.S. PATENT DOCUMENTS

| | | | |
|---|---|---|---|
| 2,426,582 | A | 9/1947 | Austin |
| 6,340,202 | B1 | 1/2002 | Stanton et al. |
| 6,416,116 | B1 | 7/2002 | Stanton et al. |
| 2009/0195015 | A1 | 8/2009 | Kerr et al. |
| 2012/0161469 | A1 | 6/2012 | Kerr et al. |

FOREIGN PATENT DOCUMENTS

| | | | | |
|---|---|---|---|---|
| CA | 2297625 A1 | * | 8/2001 | ............ B62D 31/02 |
| CN | 102582689 A | | 7/2012 | |
| CN | 104118480 A | | 10/2014 | |
| CN | 204296529 U | | 4/2015 | |
| CN | 106428240 A | | 2/2017 | |
| DE | 102007028285 A1 | | 1/2009 | |

(Continued)

OTHER PUBLICATIONS

Luxembourg Search Report/Written Opinion dated Jun. 3, 2019, 7 pages.

*Primary Examiner* — Lori L Lyjak

(74) *Attorney, Agent, or Firm* — Rankin, Hill & Clark LLP

(57) ABSTRACT

A bus structure, optionally an electric bus structure for one hundred passengers or more. The bus structure includes: a passenger compartment, a side wall with a vertical post and delimiting the passenger compartment, a horizontal support, a vertical handle—or stanchion—along the vertical post and projecting from the horizontal support, a strut projecting from the vertical post to the horizontal support, and a floor structure of reduced thickness. The strut defines a triangle with the wheel housing and the vertical post. The strut is straight or curved.

19 Claims, 7 Drawing Sheets

(56) References Cited

FOREIGN PATENT DOCUMENTS

| | | | |
|---|---|---|---|
| KR | 20020052898 | A | 7/2002 |
| KR | 20130047408 | A | 5/2013 |
| RU | 2175611 | C2 * | 11/2001 |
| WO | 2007/056840 | A1 | 5/2007 |
| WO | 2013/109162 | A1 | 7/2013 |

* cited by examiner

BUS STRUCTURE WITH A VERTICAL HANDLE FOR PASSENGERS

TECHNICAL FIELD

The invention lies in the field of bus structures. More precisely, the invention provides a bus structure enclosing a passenger compartment dotted with vertical handles.

BACKGROUND OF THE INVENTION

A bus structure withstands the passenger load which may be distributed in a heterogeneous manner within the passenger compartment. Where the bus is, an articulate bus, each unit has to communicate the trailing efforts from the tractor to the following trailers. The braking efforts are considered too. The twisting mechanical stresses intensify the efforts, and necessitate to reduce the safety margins.

The bus structure conveniently accommodates equipment such as propulsion units, energy storage, a cooling-heating system. In a purely electric bus, the electric battery weight represents a major mass of the resulting vehicle. A solution for producing an optimized bus structure is the use of interconnected tubes. A tube, of circular or square cross section, is generally a lightweight and economical element. However, a corresponding bus structure requires a multitude of tubes, which means that their assembly, costs increase significantly, such as the tube reference management. Generally, the bus structure targets a high passenger capacity, a weight reduction and an optimal safety. The comfort of the passengers is optionally addressed b a spacious passenger compartment and several handles along the vehicle. However, vertical handles, also known as "stanchions", remain complicated to integrate within the passenger compartment. Indeed, their number increases proportionally with the passenger capacity, whereas they must accommodate the seat places whose number also raises.

The document U.S. Pat. No. 6,340,202 B1 discloses a bus structure with a passenger compartment, a side wall with a vertical post between two adjacent windows, a roof forming a horizontal support, a vertical handle along the vertical post. The bus structure further comprises a top rail 19 which is transversal to the vertical post.

The document CN 106 428 240 A discloses a bus structure with a first safety partition and a second safety partition. The safety partitions comprise vertical pillars and diagonal braces. The vertical pillars have square cross sections of 40×40×2 mm.

The document CN 104 118 480 A discloses a bus structure with an underframe exhibiting vertical, horizontal and inclined elements.

Technical Problem to be Solved

It is an objective of the invention to present a bus structure, which overcomes at least some of the disadvantages of the prior art. In particular, it is an objective of the invention to stiffen a bus structure.

SUMMARY OF THE INVENTION

According to a first object of the invention, a bus structure, optionally an electric bus structure, said bus structure including: a passenger compartment, a side wall with a vertical post and delimiting the passenger compartment, a horizontal support, a vertical handle along the vertical post and projecting from the horizontal support, a strut projecting from the vertical post to the horizontal support.

Preferably, the bus structure includes a geometrical plan through the strut, the vertical post, and the vertical handle.

Preferably, the strut is disposed, at least partially, transversally between the vertical post and the vertical handle.

Preferably, the horizontal support, the vertical post and the vertical handle generally define a rectangular loop, the strut substantially defining a triangle at a corner of said rectangular loop.

Preferably, the strut includes a curved strut and includes an upper end fixed to the horizontal support.

Preferably, the side wall is a first side wall and the vertical post is a first vertical post, the bus structure further including a second side wall with a second vertical post and delimiting the passenger compartment, the curved strut additionally projecting transversally from said a second vertical post.

Preferably, the horizontal support is a first horizontal support, the bus structure further including a second horizontal support from which the vertical handle projects.

Preferably, the vertical handle, the first horizontal support, the second horizontal support and the vertical post define a closed loop, optionally a rectangle, in which the strut is disposed.

Preferably, the horizontal support is a lower horizontal support, the bus structure further including an upper horizontal support, and the strut is a lower strut projecting from the lower horizontal support, the bus structure further including an upper strut which projects from the upper horizontal support to the vertical post and which is over the lower horizontal support.

Preferably, the passenger compartment includes a longitudinal passage between the vertical post and the strut.

Preferably, the strut is inclined with respect to the vertical post and/or the side wall of an angle ($\alpha$; $\beta$) ranging from 20° to 70°; the vertical post and the side wall optionally being parallel.

Preferably, the vertical handle is welded or glued to the horizontal support, and/or the strut is welded or glued to the vertical post; possibly the horizontal support is welded or glued to the vertical post; the strut is welded or glued to the horizontal support.

Preferably, the vertical handle includes a thickness T1, and the strut includes a thickness T2, the ratio T2/T1 ranges from 1.5 to 2.5; optionally the horizontal support includes a thickness T3, on said horizontal support, the distance between the vertical handle and the strut is smaller than the thickness T3.

Preferably, the bus structure includes at least one transversal bar projecting from the vertical post to the vertical handle, or from the strut to the vertical post.

Preferably, the bus structure includes a main longitudinal beam in the roof structure and/or in the upper half of the bus structure, the main longitudinal beam is optionally thicker than each longitudinal beam of the floor structure and/or of the lower half of the bus structure.

Preferably, the bus structure includes a wheel housing, the horizontal support including a longitudinal beam projecting, at least along the whole wheel housing, the vertical handle projecting from said longitudinal beam; and/or the horizontal support includes a reinforcement beam at the top the wheel housing, said wheel housing projecting over the whole length of said reinforcement beam and the strut projecting from said a reinforcement beam.

Preferably, the bus structure includes a wheel housing, the horizontal support includes a transversal beam projecting transversally over the wheel housing, and/or over a majority of the width of the passenger compartment, the strut and the vertical handle projecting from said transversal beam.

Preferably, the transversal beam forms the wheel housing and projects transversally along the whole transversal width of said Wheel housing, the wheel housing including a biased bar which is at distance from the strut.

Preferably, the vertical handle projects over a majority of the height of the passenger compartment, and/or of the bus structure, optionally the bus structure includes an upper half in which the strut is enclosed.

Preferably, a space separates the vertical post from the vertical handle and projects vertically over the whole height of the vertical handle, optionally within the passenger compartment.

Preferably, the bus structure includes a floor, the vertical handle being vertically distant from said floor.

Preferably, the strut is straight and/or extends vertically.

Preferably, one side of the triangle is curved, and/or one angle of the triangle is chamfered.

The bus structure includes a biased link connecting the horizontal support to the vertical post, said biased link being inclined with respect to the horizontal support and to the vertical post, and including a length of at most: 10% or 15% of the length of the horizontal support or of the vertical post.

Preferably, the bus structure includes a set of coplanar vertical handles which defines an inner plane parallel to the side wall.

Preferably, the curved strut includes a middle fixed to the horizontal support or to the vertical post.

Preferably, the vertical handle transversally faces the strut.

Preferably, the horizontal support vertically faces the strut.

Preferably, the roof forms the main structure of the bus structure.

Preferably, the beams, posts, rods, links, and bars are made of aluminium alloy, or of composite material.

Preferably, the biased bar is biased with respect to the horizontal support and the vertical post, and optionally projecting from the vertical post.

Preferably, the strut projects from the wheel housing.

Preferably, the length of the strut represents at least the half of the length of the vertical handle and/or of the vertical post.

Preferably, the vertical post projects from the horizontal support.

Preferably, the bus structure includes a longitudinal central axis which is perpendicular to the geometrical plane. The inclination of the vertical handle with respect to the strut ranges from: 80° to 10°, or 60° to 30°.

Preferably, the vertical post includes a thickness T4 which is smaller than the thickness T2 of the strut.

Preferably, the bus structure includes a side sill delimited by the horizontal support, the vertical handle and the strut projecting from said side sill, the side sill enclosing optionally the wheel housing.

Preferably, the strut projects over a majority of the height of the passenger compartment, and/or of the bus structure. The bus structure includes a lower half with a wheel housing, the vertical handle projecting from said wheel housing, optionally from a transversally inner end of the wheel housing.

Preferably, the strut and/or the vertical handle each have a circular cross section, the strut being optionally disposed in the passenger compartment.

Preferably, the rectangular loop is a closed rectangular loop.

Preferably, the curved strut includes a radius, for instance a minimum radius, of at least: 1 m, or 2 m, or 3 m;

Preferably, the vertical handle is parallel to the vertical post.

Preferably, the vertical handle, the strut and the vertical post are coplanar; preferably the vertical handle, the strut and the vertical post each comprise a main axis, said main axes being coplanar.

Preferably, the strut essentially vertically projects from the vertical post to the horizontal support.

Preferably, the strut substantially transversally extends at the level of the vertical handle.

Preferably, the vertical handle and the strut comprises vertical ends in contact or joined to the horizontal support, said vertical ends being at the same vertical level.

Preferably, the vertical handle is between front wheels and rear wheels of the bus; and/or between a front wheel housing and a rear wheel housing.

Preferably, the passenger compartment surrounds the vertical handle.

Preferably the upper end of the handle is at distance from the strut.

Preferably, the strut is in contact of the vertical post and/or the horizontal support.

Preferably, the strut vertically extends along the vertical handle and/or the vertical post.

Preferably, the strut is vertically level with the vertical handle and/or the vertical post.

Preferably, the strut is transversally between the vertical handle and the vertical post.

Preferably, the strut is transversally at distance from the vertical handle and the vertical post.

Preferably, the vertical post vertically extends form the horizontal support.

Preferably, the strut mainly extends vertically.

Preferably, the horizontal support it the roof of the bus structure, or the horizontal support is vertically at distance from the roof.

Preferably, the strut is longitudinally disposed along and/or level with the wheel.

Preferably, the wheel defines a transversal width, the strut extending along, the whole transversal width of the wheel.

Preferably, the at least forty seat places comprise a longitudinal row of seat places which includes two adjacent seat places, the strut being longitudinally disposed between said two adjacent seat places.

It is another object of the invention to provide a bus structure, optionally an electric bus structure, said bus structure including: a passenger compartment, a side wall with a vertical post and delimiting the passenger compartment, a vertical handle along the vertical post, a strut projecting from the vertical post, a horizontal support joining the vertical handle to the strut.

It is another object of the invention to provide a bus structure, optionally an electric bus structure, said bus structure including: a passenger compartment, a horizontal support, a vertical handle projecting from the horizontal support, a strut projecting from the horizontal support; a side wall with and delimiting the passenger compartment, and including a vertical post linked to the strut and to the horizontal support.

It is another object of the invention to provide a bus structure, optionally an electric bus structure, said bus structure including: a passenger compartment, a side wall with a vertical post and delimiting the passenger compartment, a horizontal support and/or a transversal bar projecting from the vertical post, a vertical handle along the vertical post and optionally projecting from the horizontal support, a strut projecting from the vertical post toward vertical handle, the horizontal support, the vertical post ant the strut essentially defining a trigon and/or a triangle, and/or the vertical handle, the strut and the transversal bar essentially defining a trigon, optionally a triangle.

It is another object of the invention to provide a bus including a passenger compartment, with at least one hundred passenger places, optionally with at least forty seat places, and a bus structure, wherein the bus structure is in accordance with the invention, preferably the bus includes a wheel, the horizontal support projecting above or over said wheel.

A bus structure comprising: a passenger compartment; a side wall including a vertical post, said vertical post delimiting the passenger compartment; a wheel housing including a horizontal support; a vertical handle along the vertical post and projecting from the horizontal support of the wheel housing; a strut linking the vertical post to the horizontal support of wheel housing.

A bus comprising: a passenger compartment; at least forty seat places; at least one wheel; a bus structure, said bus structure including: a horizontal support, a side wall including a vertical post which delimits the passenger compartment and which vertically extends from the horizontal support, a vertical handle along the vertical post and extending from the horizontal support; a strut projecting from the vertical post toward the horizontal support.

The different objects of the invention may be combined to each other. In addition, the preferable options of each object of the invention may be combined with the other objects of the invention, unless the contrary is explicitly mentioned.

Technical Advantages of the Invention

The invention provides a bus structure combining a side wall, a vertical handle and a therebetween strut. The strut, straight or curved, thrills a blocking link reducing potential movement between the post and the handle. Thus, the bus structure totally integrates the vertical handle within the supporting structure, and further blocks the deformation by locating a strut engaging the vertical post and the support from which the vertical handle starts, it may be underlined that the strut offers further grip solution to passengers since it is in the passenger compartment. Thus, the strut and the vertical handle create a stiffness grip module.

As the vertical handle is involved in the general strength, efforts from the floor structure are communicated more directly to the roof structure. Therefore, the floor structure may benefit from the strength of the latter, and its reduced thickness eases docking due to its low platform. Then, the bus user comfort improves.

BRIEF DESCRIPTION OF THE DRAWINGS

Several embodiments of the present invention are illustrated by way of figures, which do not limit the scope of the invention, wherein FIG. 1 provides a schematic illustration of a side view of a bus in accordance with a preferred embodiment of the invention.

DETAILED DESCRIPTION OF THE INVENTION

This section describes the invention in further detail based on preferred embodiments and on the figures. Similar reference numbers will be used to describe similar or the same concepts throughout different embodiments of the invention.

It should be noted that features described for a specific embodiment described herein may be combined with the features of other embodiments unless the contrary is explicitly mentioned.

Features commonly known in the art will not be explicitly mentioned for the sake of focusing on the features that are specific to the invention. For example, the bus in accordance with the invention is evidently powered by an electric supply, even though such supply is not explicitly referenced on the figures nor referenced in the description.

By way of convention, it may be defined that the word "longitudinal" refers to the longitudinal direction and may correspond to the main driving direction of the bus. The word "transversal." refers to the transversal direction and may be perpendicular to the longitudinal direction. The word "inner" and "outer" may be considered transversally. Inner may mean toward the centre, and outer tower the environment. It may be understood that a beam is horizontal.

Figure 1:
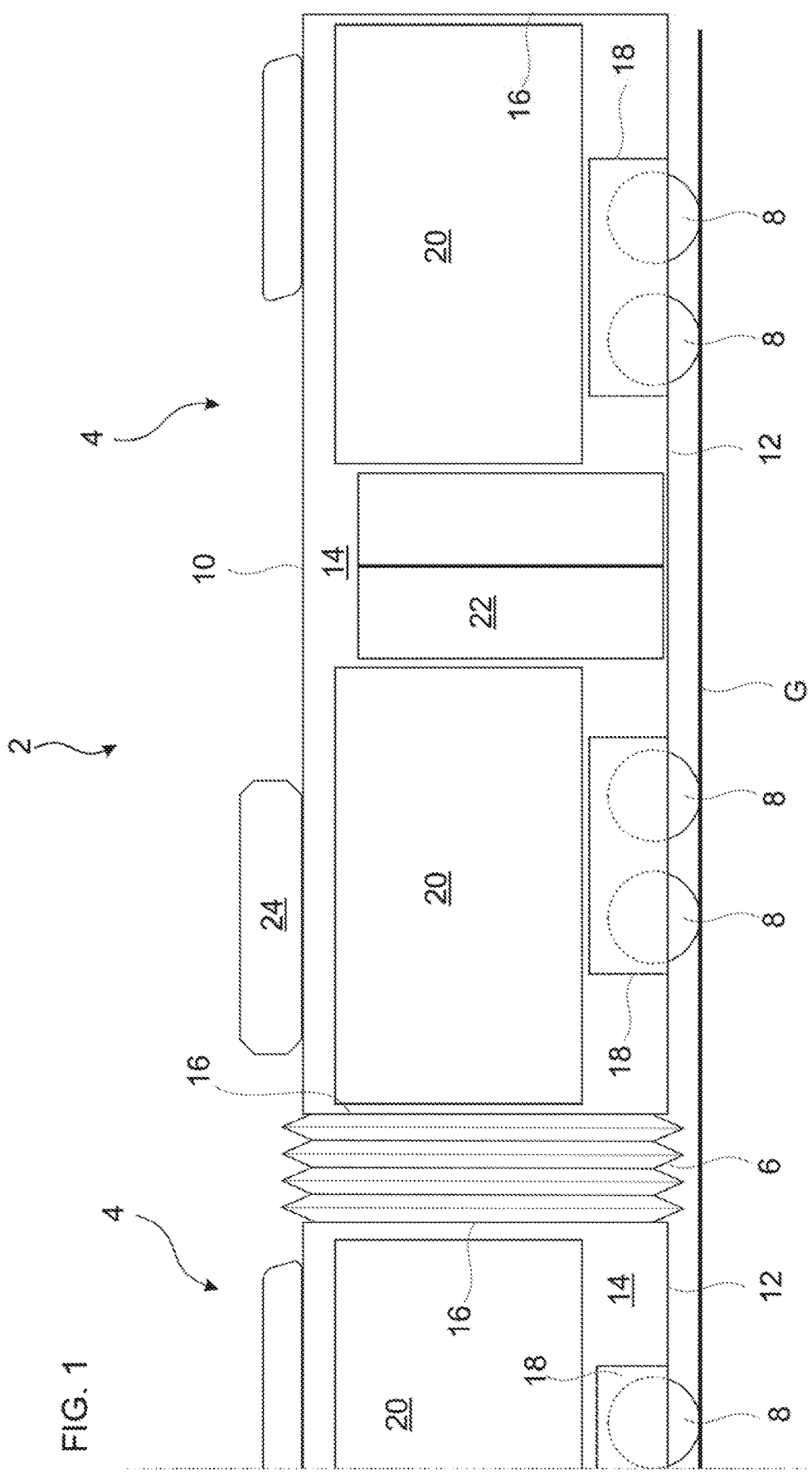

FIG. 1 shows a vehicle for mass transportation. The vehicle is adapted for transportation of passengers in cities and may transport about one hundred passengers, for instance one hundred and twenty passengers. The vehicle may be a bus 2, optionally an electric bus 2. An electric bus 2 is understood as a bus using electric power for its driving engine(s), preferably exclusively electric energy. Hence, the electric bus 2 may be free of combustion engine. The bus 2 may include electric driving engines and electric batteries (not represented) powering the electric driving engines.

The bus 2 may be an articulated bus. It may comprise a first unit 4 and a second unit 4 (partially represented). Each unit 4, may form a body, and/or may form a rigid element. Each unit 4 may be a trailer and/or a tractor. Each unit 4 may be self-supporting. These units 4 may be joined by a connection, for instance a hinged connection 6 enabling the units 4 to swivel with respect to each other. In the current illustrative example, only two units 4 are represented, however it is contemplated in the current invention that the electric bus 2 includes three, four, or more units 4, which are articulated with respect to one another by hinged connection 6. Then, the passenger capacity may be more than two hundred.

A bus formed of a single unit is also considered.

Each unit 4 may include several wheels 8 engaging the ground G. Pairs of symmetric wheels 8 may form axles, for instance four axle for each unit 4. The axles and thus the wheels 8 may be distributed along the length of the bus 2

The bus 2 may include a structure. The structure may include a roof 10, and/or a platform 12, and/or side walls 14. The side walls 14 may be outer walls. Two transversally opposite side walls 14 may go down from the roof 10 to the platform 12. The side walls 14 may also project longitudinally from one longitudinal end 16 to the opposite longitudinal end 16. They may form the bodywork of the bus 2. They may cover transversally the wheels 8.

For instance; the side walls 14 may close the wheel housings 18. The latter may optionally receive the wheels 8 by pairs. Optionally, at least one or each wheel housing 18 may receive two longitudinally spaced wheels 8. The wheel housings 18 may form downward opened boxes.

The side walls 14 may receive windows 20. Optionally, doors 22 are be arranged in one of the two side walls 14, optionally between windows 20. The roof 10 may support equipment, for instance an air conditioning system 24, and other systems as well.

Figure 2:
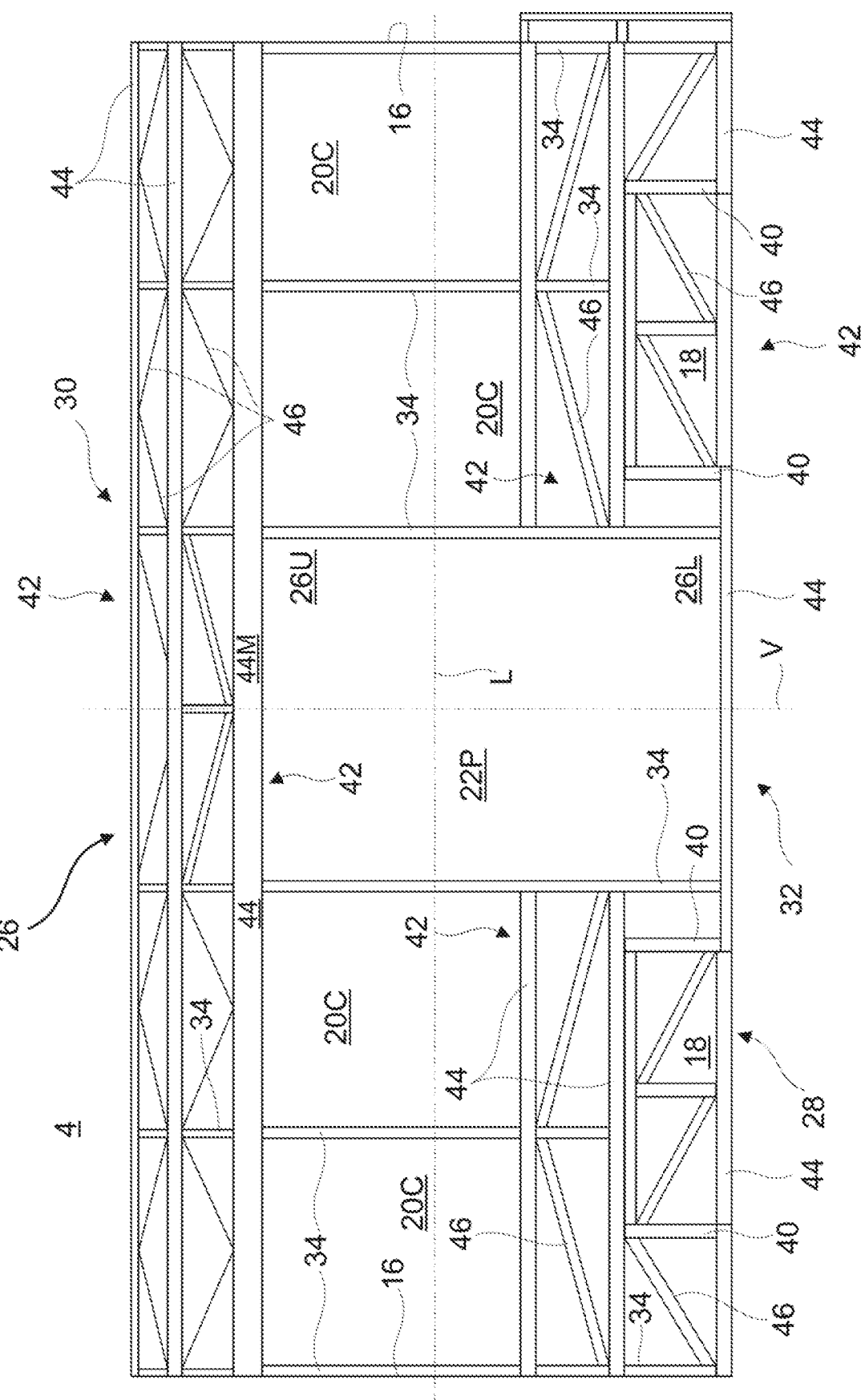
FIG. 2 provides a schematic illustration of a side view of a bus structure in accordance with a preferred embodiment of the invention.

FIG. 2 shows a bus structure 26, optionally of an electric bus. The bus may correspond to the one as described in FIG. 1. FIG. 2 is a side view, thus only one side is visible. The bus structure 26 currently represented may correspond to the structure of a single unit 4. A longitudinal axis L projecting horizontally and a vertical axis V are represented. The longitudinal axis L may delimit the upper half 26U and the lower half 26L of the bus structure 26.

The bus structure 26 may comprise an upper portion, optionally a roof structure 30 forming the roof, and a lower portion, optionally a floor structure 32 forming the floor and or the platform. The floor structure 32 may include a grid, optionally of interconnected transversal and longitudinal beams (not represented). Diagonal beams may be added. The bus structure 26 may additionally include side structures 28 forming the side walls.

The side structures 28 may comprise vertical posts 34. The vertical posts 34 may project from the floor structure 32 up to the roof structure 30. Each vertical post 34 may be integral, or may be formed of vertically aligned elements, optionally of different thicknesses. At least one, or several, or each vertical post 34 may project over the majority of the height of the unit 4. The vertical posts 34 may delimit the window contours 20C. Two vertical posts 34 may delimit a door passage 22P.

Two other vertical posts 34 may be at the longitudinal ends 16 of the unit 4, optionally of the bus structure 26. The longitudinal ends 16 may substantially differ from each other in order to accommodate a hinged connection (not represented). In the current example, six vertical posts 34 are represented, and six others are in the hidden side structures 28. However, the invention considers any other number of vertical posts 34.

The bus structure 26 may be adapted in order to define the wheel housings 18. The wheel housings 18 may be delimited by vertical bars 40, which are for instance part of the side structures 28. It may be considered that the wheel housings 18 are part of the platform structure 32, and/or at the connection between the floor structure 32 and the side structure 28.

The bus structure 26 may comprise horizontal supports 42, some of which may project up to the longitudinal ends 16. At least one or each horizontal support 42 may comprise horizontal beams. The horizontal supports 42 may comprise longitudinal beams 44, optionally forming the roof structure 30 and/or the floor structure 32. At least one or several longitudinal beams 44 may project over the whole length of the bus structure 26. The longitudinal beams 44 may a comprise a main longitudinal beam 44M, or a pair of main longitudinal beams 44M. The main longitudinal beams 44 may be the thickest, optionally vertically thickest, of the bus structure 26. The main longitudinal beams 44M may be thicker than the longitudinal beams 44 forming the floor structure 32, and possibly the lower half 26L.

It may be noticed that the floor structure 32 may include a single layer of horizontal supports 42, optionally a single layer or horizontal beams which may define a horizontal grid. The roof structure 30 may comprise longitudinal beams 44 disposed at several levels, the main longitudinal beams 44M being optionally part of one of these levels. Thus the main supporting portion of the bus structure 26 may be at the top, optionally the roof structure 30, or more generally the upper half 26U. By way of consequence, the floor structure 32 may be thinner and the altitude of the floor may be reduced. Then, it become easier to lower or to kneel at the height of a bus stop platforms, which are generally at about 20 cm to 25 cm. Then the invention offers a compromise between the bus structure strength, the weight, and the adaptation to low bus stops.

In order to strengthen further the bus structure 26, biased rods 46 may be used. The biased rods 46 may be disposed in the side structures 28. The biased rods 46 may be arranged within the rectangles formed by the longitudinal beams 44 in combination with the vertical posts 34 and/or the vertical bars 40. The biased rods 46 may be at the diagonals of the rectangles. They may be inclined with respect to the longitudinal axis L and/or the vertical axis V of 20° to 70°, or 30° to 60°, values included.

Each strut 60 may be longitudinally disposed along and/or level with the wheel 8. The wheels 8 may each define a transversal width. The struts 60 may extend transversally along the whole transversal widths of the wheels 8. Each strut 60 may cross the transversal width of the wheels 8. Thus, the struts 60 are transversally longer, which increase the transversal stiffness of the bus structure.

Figure 3:
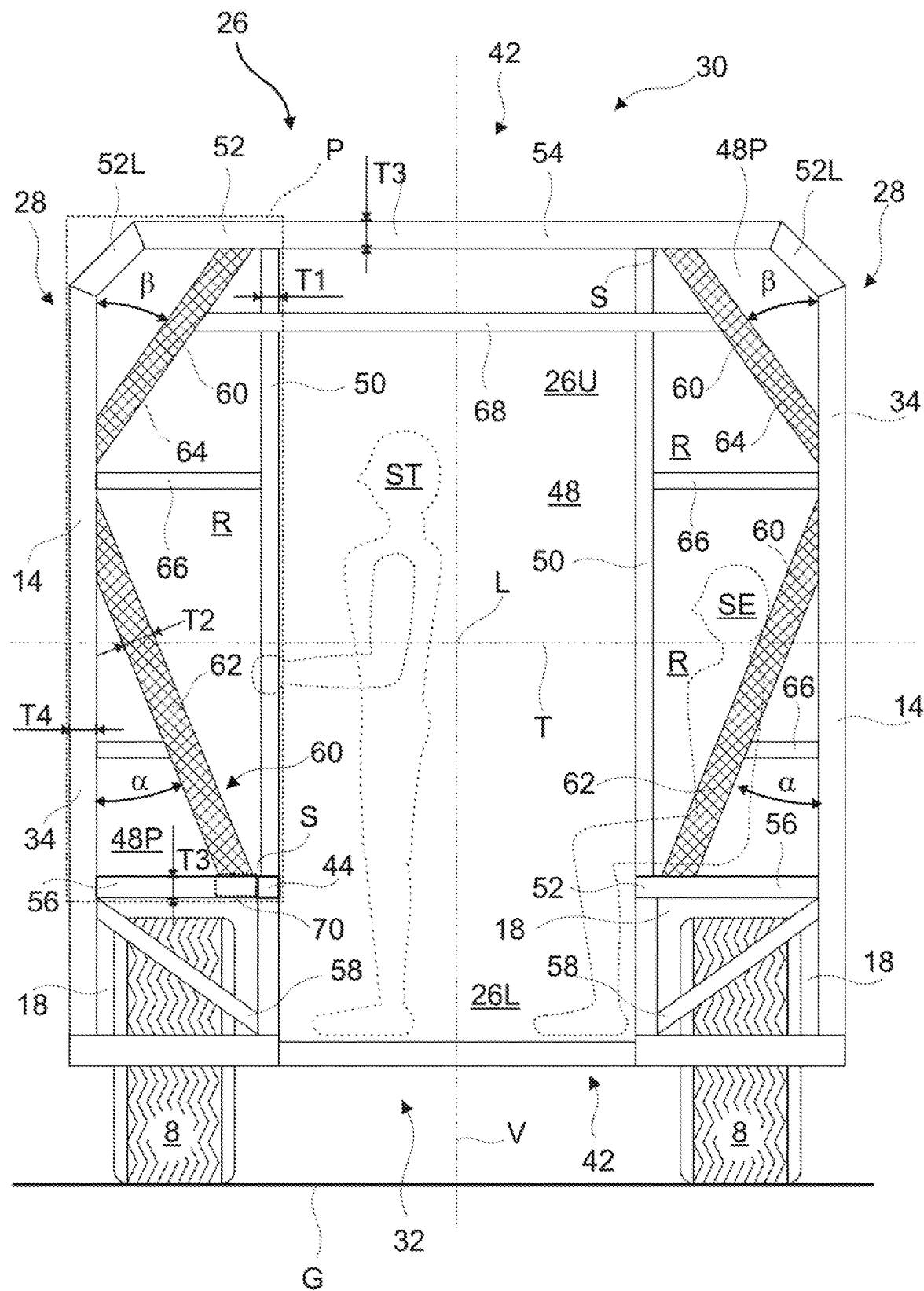
FIG. 3 provides a schematic illustration of a longitudinal view of a bus structure in accordance with a preferred embodiment of the invention, FIG. 4 provides a schematic illustration of a longitudinal view of a bus structure in accordance with a preferred embodiment of the invention, FIG. 5 provides a schematic illustration of a longitudinal view of a bus structure in accordance with a preferred embodiment of the invention, FIG. 6 provides a schematic illustration of a longitudinal view of a bus structure in accordance with a preferred embodiment of the invention, FIG. 7 provides a schematic illustration of a longitudinal view of a bus structure in accordance with a preferred embodiment of the invention.

FIG. 3 provides a schematic illustration of a preferred embodiment of the invention. It represents a longitudinal view of the bus structure 26, or a portion of the bus structure 26. The current front view may form a cross section of the bus structure 26.

The longitudinal axis L, the vertical axis V and the transversal axis T are represented. The longitudinal central axis L may delimit the upper half 26U and the lower half 26L of the bus structure 26, as le left half from the right half. The passenger compartment 48 is encircled by the bus structure 26A seated passenger SE and a standing passenger ST are installed in the passenger compartment 48.

The bus structure 26 may be generally symmetric with respect to a sagittal plan. Said sagittal plan may include the longitudinal axis L and the vertical axis V. The bus structure 26 may include two symmetric portions. For the sake of conciseness, the following description will be carried out in relation with one of said two portions, however it could apply to the both. Consequently, elements from one side may be duplicated.

The bus structure 26 includes at least one vertical handle 50. The vertical handle 50 may be parallel to, and may be transversally distant from, the side walls 14, optionally form the side structures 28.

The vertical handle 50 may project from the roof structure 30. The vertical handle 50 may project over a majority of the height of the passenger compartment 48. The vertical handle 50 may be straight. The vertical post 34 may substantially project over the whole height of the vertical handle 50.

The horizontal support 42 may include at least one transversal beam 52, or several transversal beams 52. The transversal beams 52 may be arranged in the roof structure 30, and/or form the wheel passages 18. Thus, there may be an upper transversal beam 54 and at least one lower transversal beam 56. The vertical handles 50 may project from the upper transversal beam 54 to the lower transversal beams 56 or more generally from one transversal beam 52 to a vertically opposite transversal beam 52. The vertical handle 50 may be parallel to the vertical post 34.

The bus structure 26 may comprise biased bars 58, for instance at the longitudinal ends. The wheel housings 18 may comprise biased bars 5$, optionally at their longitudinal extremities. The biased bars 58 may be inclined with respect to the horizontal supports 42, and with respect with the vertical direction. The biased bards 58 may be perpendicular to the longitudinal axis L.

The vertical post 34 may form the side structure 28, and optionally the side wall 14. The vertical post 34 may project over the whole height of the bus structure 26. It may project from the floor structure 32 to the roof structure 30. It may be integrally formed, or formed of several vertical elements. The transversal beam 52 forming the roof structure 30 may be directly in contact of the vertical post 34. Alternatively, the transversal beam 52 may be joined to the vertical post 34 by means of a biased link 52L. The biased link 52L, may be inclined at 45 with respect to the transversal beam 52 and to the vertical beam 54. The biased link 52L may form chamfer at the corners of the substantially rectangular outline of the bus structure 26.

It should be understood that the concept of vertical post is not limited to a one-piece vertical post, or to a continuous and homogeneous vertical post indeed, a vertical post may be crossed by a longitudinal beam. Then the concept of a vertical post may correspond to a vertical alignment of elements or of matter, optionally of alloy. The same consideration may apply to beams. Thus, a beam may correspond to a horizontal alignment of elements or of matter.

The bus structure 26 may comprise at least one strut 60, possibly at least two struts 60. The struts 60 may form several sets of struts 60. The struts 60 may project from the vertical posts 34, and may optionally be in contact and/or fixed thereon. The struts 60 may project form the horizontal support 42, and may optionally in contact and/or fixed thereon. The struts 60 may be inclined with respect to the horizontal supports 42 and with respect to the vertical posts 34. At least one strut 60 or set of struts 60 may be above and/or over a wheel 8, respectively a wheel housing 18.

The struts 60 may comprise a lower strut 62 and upper strut 64. The lower strut 62 may project from the wheel housings 18, optionally from a transversal beam 56, which provides a lower horizontal support 42. The lower strut 62 may be inclined with respect to the vertical post 34, and may form therewith an angle α. Angle α may range from: 10° to 80° or 20° to 70°, or 30° to 60°. It may be noticed that several rectangles R are defined by the lower transversal beam 56, the vertical post 34, the vertical handles (60-64) and the upper transversal beam 54. Each of these rectangles R include a lower, transversally outer corner on which a triangle is closed by the corresponding lower strut 62. Thus, the rectangles R are stiffened by the lower strut 62, which increase the rigidity of the bus structure 26.

The upper, transversally outer corners of the rectangle R, or one of the rectangle R, may be stiffened by the upper strut 64. A triangle may be formed thereon. The upper strut 64 may join the vertical post 34 to the upper transversal beam 54. The upper strut 64 may be inclined with respect to the vertical post 34, and may form therewith an angle β. Angles β may range from: 10° to 80°, or 20° to 70°, or 30° to 60°.

The struts 60 may be at distance from the side wall 14. Thus, the passenger compartment 48 may include longitudinal passages 48P between the vertical post 34 and the lower strut 62 and the upper strut 64 respectively.

The struts (60-64) may be disposed between the vertical handle 50 and the vertical post 34. The may be coplanar. Thus, the bus structure 26 may comprise a plan, optionally a geometrical plan P, across the lower strut 62, the upper strut 64, the vertical handle 50 and the vertical post 34. The geometrical plan P may be perpendicular to the longitudinal axis L. It may also be across the upper transversal beam(s) (52-56). The geometrical plan P may be a fictions flat surface. The geometrical plan P may comprise the rectangular loop(s) R.

The bus structure 26 may include transversal bars 66 projecting from the vertical posts 34 to the vertical handles 50, and/or from the vertical posts 34 to the lower struts 62. Thus, further triangles may be defined, optionally over the previous one. These triangles may have a same upper corner. Similarly; further rectangular loops R may be defined, for instance within another rectangular loop R.

The bus structure 26 may exhibit a cross beam 68. It may be vertically distant from the upper transversal beam 54. The cross beam 68 may connect the vertical handle 50 to the associated upper strut 64. It may connect two upper struts 64. The cross beam 68 may cross the vertical handle 50. It may project through or over the passenger compartment 48.

In an alternative embodiment represented on the left side of FIG. 3, the bus structure 26 may include a reinforcement beam 70, optionally along the longitudinal beam 44. The reinforcement beam 70 may be adjacent and parallel to the longitudinal beam 44 upside the wheel housing 18. The reinforcement beam 70 may partially delimit the wheel housing 18. The reinforcement beam 70 may be above the wheel 8. The reinforcement beam 70 may project longitudinally, and may be enclosed in the wheel housing's length.

The reinforcement beam 70 may receive the lower strut 62. The vertical handle 50 may project from the longitudinal beam 44, optionally the longitudinal beam 44 projecting from a lower transversal beam 56. Thus, the lower ends of the vertical handle 50 and of the lower strut 62 are substantially received at a same location, in order to define a triangle in combination with the above transversal bar 66.

The vertical handle includes a thickness T1, and the strut 60 includes a thickness T2, optionally different from the thickness T1. The vertical handle 50 and the strut 60 may be formed of tubes. The ratio may range from: 1 to 3, possibly from 1.5 to 2.5. The horizontal support 42 may include a vertical thickness T3. At the vertical ends of the vertical handle 50, thus at the upper transversal beam 54 and at the lower transversal beam 56, the distance between the vertical handle 50 and the strut (62; 64) is smaller than the thickness 13. Then, a transversal separation S is provided between the vertical handle 50 and the strut 60, optionally between their vertical ends. The separation S may reduce stress concentration in the horizontal support 42. The separation S may be smaller than the thickness T3.

The vertical post 34 may include a thickness T4 different from thickness T1 The thickness 14 may be smaller than the thickness T2 of the strut 60. Thus, the strut is involved in the stiffness of the bus structure 26, and permits to reduce the size of the vertical post. In addition, the stiffness is further increased by the vertical handle 50 that integrally becomes a supporting element joining the roof structure 30 to floor structure 32. The vertical handle 50 may transmits efforts from wheels 8.

The bus structure 26 may draw a cage. It may be formed of alloy, for instance an aluminium alloy. The horizontal support 42 may comprise the same material as the strut 60, the vertical handle 50, the vertical post 34. These elements may be welded or glued to each other wherever they are in contact, or at each interface. These elements may be fixed wherever one of these element projects form another one. Alternatively or optionally, one or all elements of the bus structure comprise composite material, optionally with an organic matric combined with a fibrous reinforcement. The vertical handle 50 comprises handle vertical ends which are joined and/or in contact of the horizontal support(s) 42, for instance the beams (52-56). The struts (62; 64) also comprises strut vertical ends in contact and/or joined to the horizontal support(s) 42; said strut vertical ends being vertically level with the handle vertical ends. This feature strengthen the structure.

Figure 4:
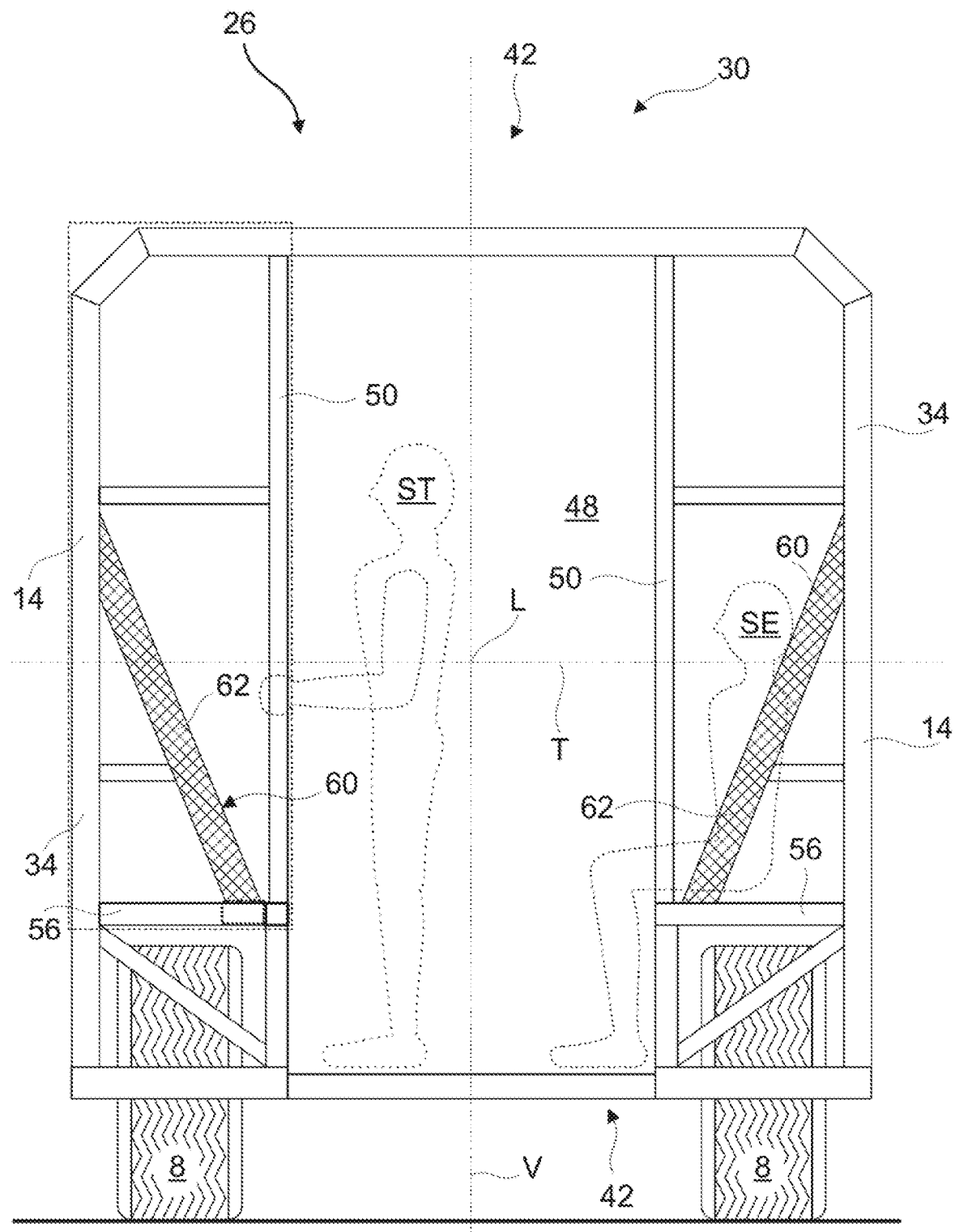

FIG. 4 provides a schematic illustration of a preferred embodiment of the invention. It represents a longitudinal view of the bus structure 26, or, a portion of the bus structure 26. The longitudinal axis L the vertical axis V are represented. A transversal axis T is also represented. A seated passenger SE and a standing passenger ST are represented installed in the passenger compartment 48.

The bus structure 26 may be generally symmetric with respect to a sagittal plan. Said sagittal plan may include the longitudinal axis L and the vertical axis V. The bus structure 26 may include two symmetric portions. For the sake of conciseness, the following description will be carried out in relation with one of said two portions, however it could apply to the both. Consequently, elements from one side may be duplicated.

The bus structure 26 in accordance with the current preferred embodiment of the invention is substantially similar to the one in accordance with FIG. 3. It substantially differs in that the strut 60 essentially includes a lower strut 62.

The bus structure 26 includes a passenger compartment 48, a side wall 14 with a vertical post 34 and delimiting the passenger compartment 48, a horizontal support 42, a vertical handle 50 along the vertical post 34 and projecting from the horizontal support 42, a strut 60 projecting from the vertical post 34 to the horizontal support 42. More specifically, the lower strut 62 projects downward from the vertical post 34 to the lower transversal beam 56, and may meet the lower end of the vertical handle 50. A cross beam (not represented) may be added.

The lower strut 62 transfers load from the wheel 8 to the roof structure 30, optionally through the vertical post 34.

Figure 5:
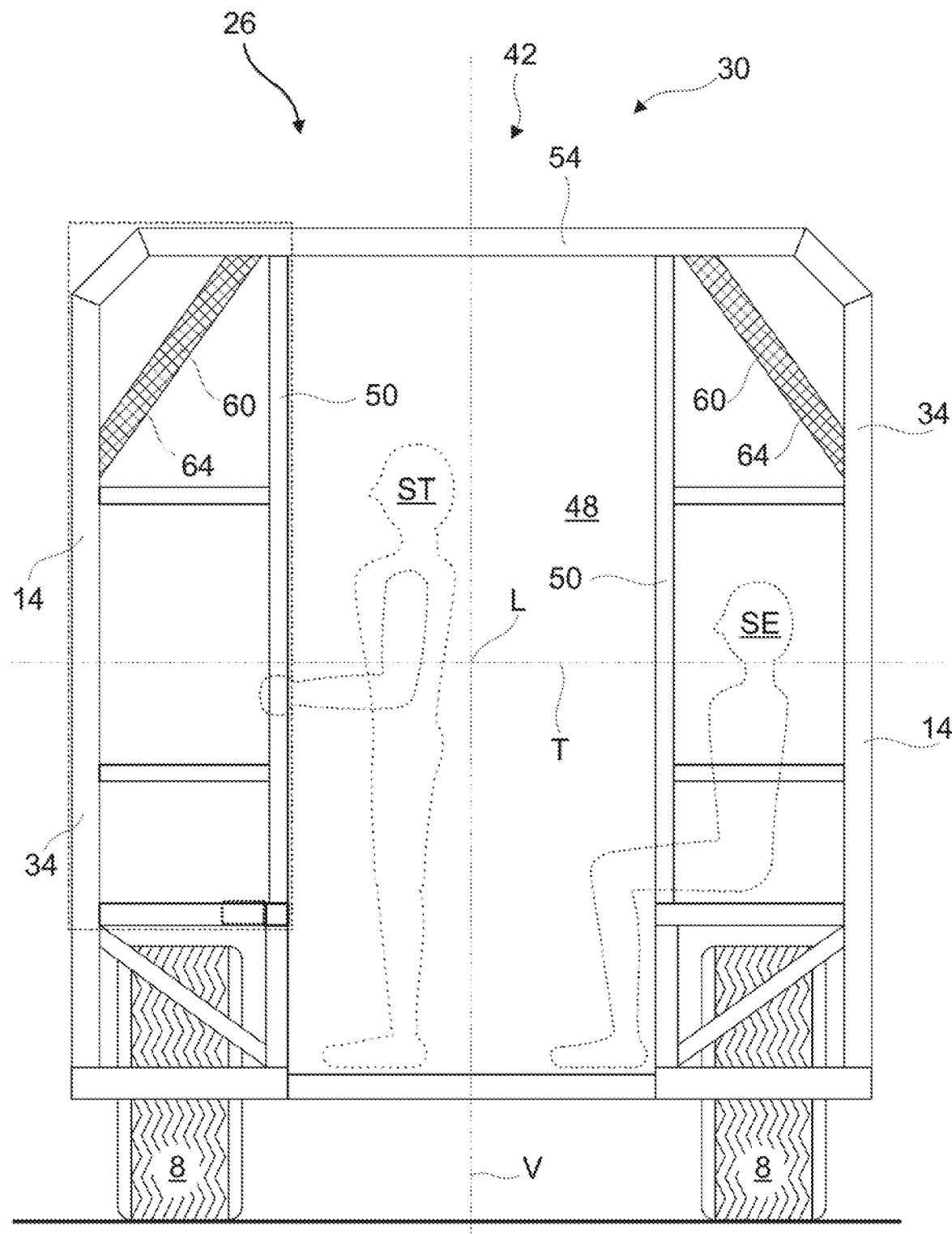

FIG. 5 provides a schematic illustration of a preferred embodiment of the invention. It represents a longitudinal view of the bus structure 26, or a portion of the bus structure 26. The longitudinal axis L, the vertical axis V and the transversal axis T are represented. A seated passenger SE and a standing passenger ST are installed in the passenger compartment 48.

The bus structure 26 may be generally symmetric with respect to a sagittal plan. Said sagittal plan may include the longitudinal axis L and the vertical axis V. The bus structure 26 may include two symmetric portions. For the sake of conciseness, the following description will be carried out in relation with one of said two portions, however it could apply to the both. Consequently, elements from one side may be duplicated.

The bus structure 26 in accordance with the current preferred embodiment of the invention is substantially similar to the one in accordance with FIG. 3. It substantially differs in that the strut 60 essentially includes an upper strut 64.

The bus structure 26 includes a passenger compartment 48, a side wall 14 with a vertical post 34 and delimiting the passenger compartment 48, a horizontal support 42, a vertical handle 50 along the vertical post 34 and projecting from the horizontal support 42, a strut 60 projecting from the vertical post 34 to the horizontal support 42. More specifically the upper strut 64 projects upward from the vertical post 34 to the upper transversal beam 54, and may be at the upper end of the vertical handle 50.

The upper strut 64 transfers load from the wheel 8 to the roof structure 30, optionally through the vertical post 34.

Figure 6:
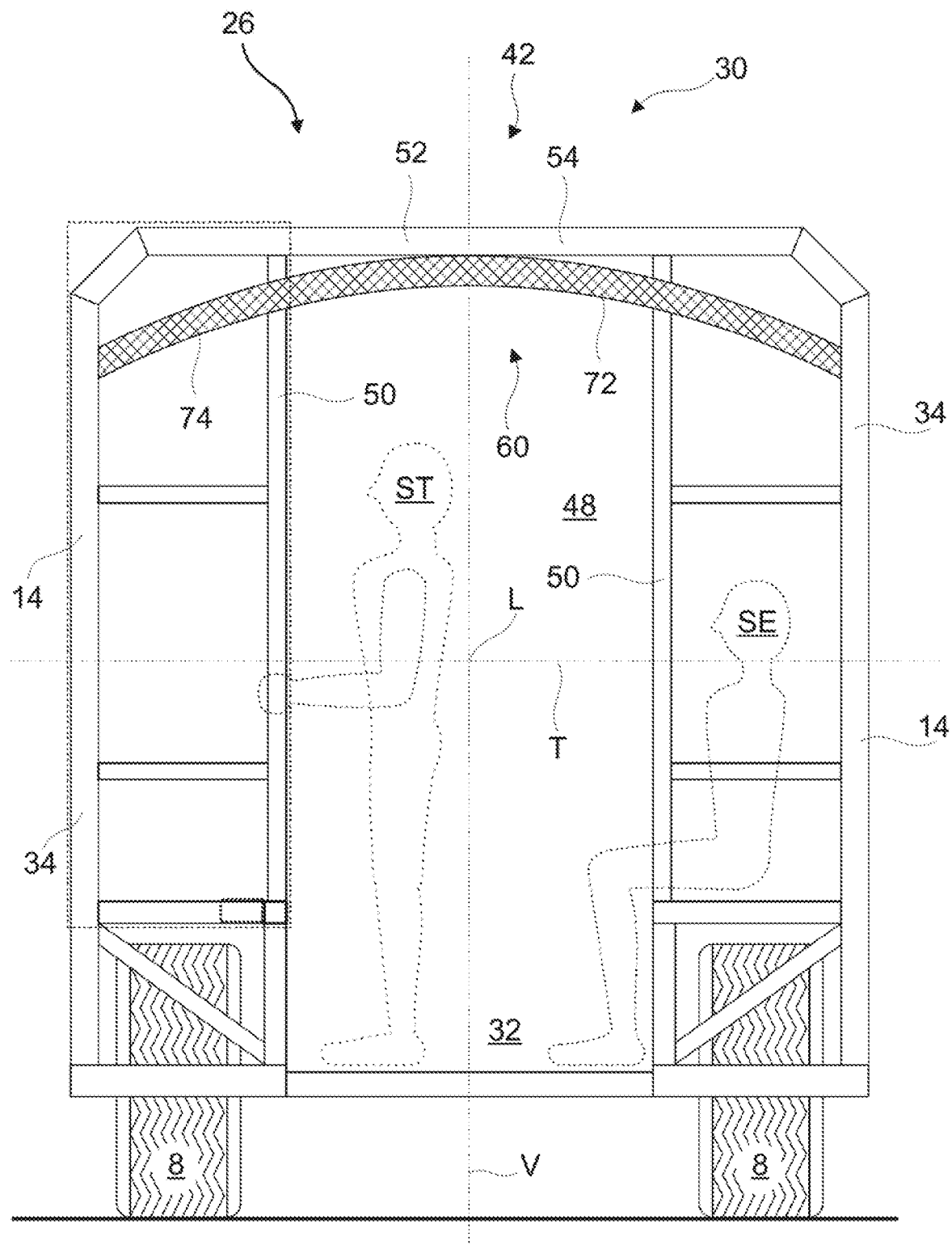

FIG. 6 provides a schematic illustration of a preferred embodiment of the invention. It represents a longitudinal view of the bus structure 26, or a portion thereof. The longitudinal axis L, the vertical axis V and the transversal axis T are represented. A seated passenger SE and a standing passenger ST are installed in the passenger compartment 48.

The bus structure 26 may be generally symmetric with respect to a sagittal plan. Said sagittal plan may include the longitudinal axis L and the vertical axis V. The bus structure 26 may include two symmetric portions. The strut 60 may be symmetrical with respect to the sagittal plan.

The bus structure 26 in accordance with the current preferred embodiment of the invention is substantially similar to the one in accordance with FIG. 3. It substantially differs in that the strut 60 may comprise a curved strut 72, optionally an upper curved strut 74 which may generally be an upper strut 74. The convex side of the upper curved strut 74 may face upward. The concave side of the curved strut 72 may face the longitudinal axis L, and possibly the floor structure 32.

The upper curved strut 74 may project over the whole width of the passenger compartment 48. The upper curved strut 74 may exhibit a profile and a centre line along which the profile is repeated.

The centre line may be curved, and may comprise a radius ranging from: 1 m to 100 m, or 2 m to 20 m, or 3 m to 10 m.

The bus structure 26 includes a passenger compartment 48, a side wall 14 with a vertical post 34 and delimiting the passenger compartment 48, a horizontal support 42, a vertical handle 50 alongside the vertical post 34 and projecting from the horizontal support 42, a strut 60 projecting from the vertical post 34 to the horizontal support 42. More specifically the upper curved strut 74 projects from the vertical post 34 to the upper transversal beam 54. The upper curved strut 74 may be crossed vertically by the vertical handle 50.

The upper curved strut 74 may project form one side wall 14 to the opposite side wall 14. Its transversal ends may be fixed to the opposite and symmetrical vertical posts 34. The upper portion, optionally the summit, of the upper curved strut 74 may be fixed to the upper transversal beam 54.

The middle of the upper curved strut 74 may be fixed to the transversal beam 52.

The upper curved strut 74 transfers load from the wheel 8 to the upper transversal beam 54, optionally through the vertical post 34. In addition, it reduces transversal deformation, and reduces motions of the roof structure 30 with respect to the floor structure 32.

It is noteworthy that the embodiment of FIG. 6 may be combined with the embodiment of FIG. 4. Then the lower struts and the upper curved strut would be crossed by the geometrical plan, and may be disposed longitudinally level with, and/or between, two vertical posts. These two vertical posts may be symmetric and/or transversally opposite.

Figure 7:
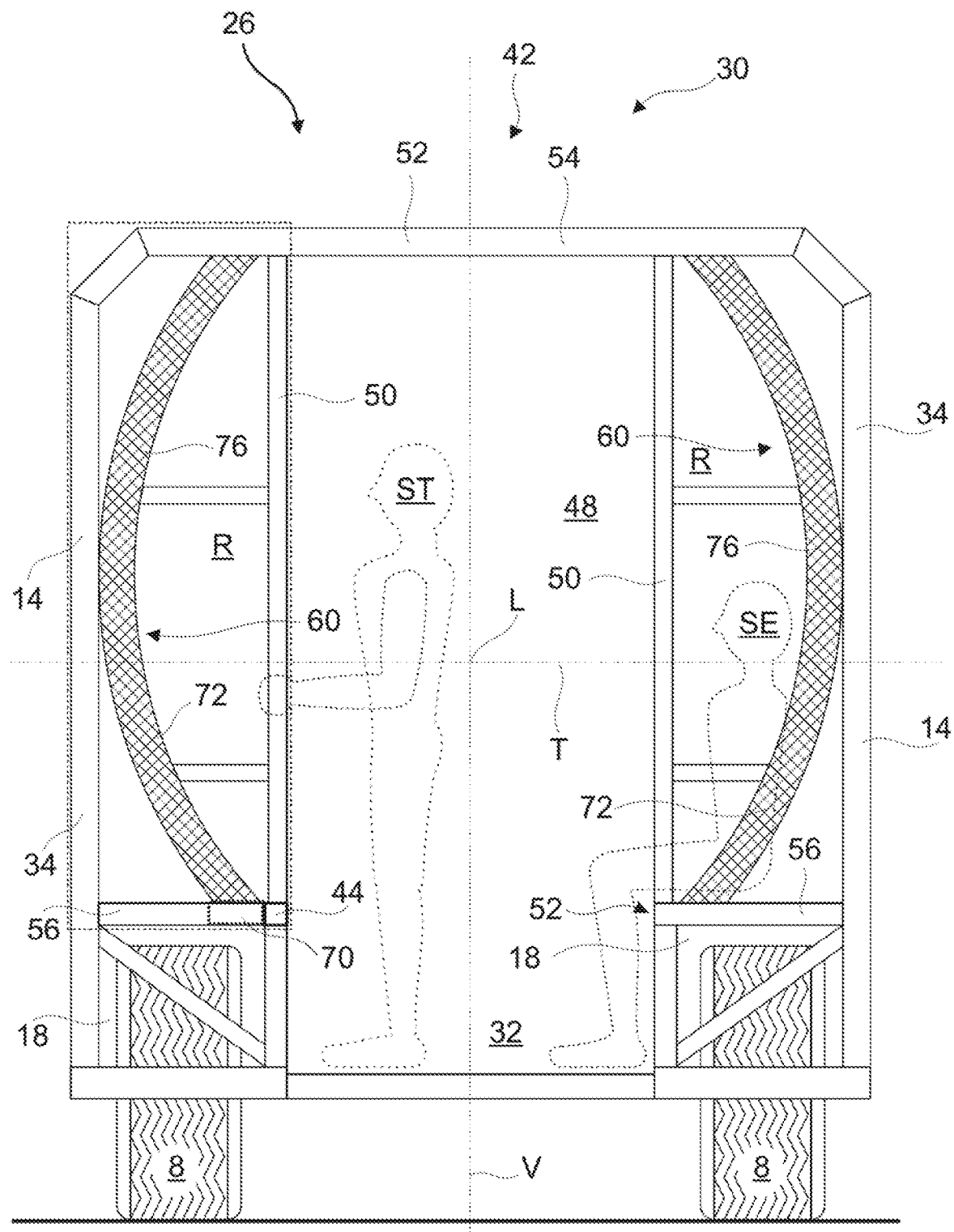

FIG. 7 provides a schematic illustration of a preferred embodiment of the invention. It represents a longitudinal view of the bus structure 26, or a portion of the bus structure 26. The longitudinal axis L, the vertical axis V and the transversal axis T are represented. A seated passenger SE and a standing passenger ST are represented installed in the passenger compartment 48.

The bus structure 26 may be generally symmetric with respect to a sagittal plan. Said sagittal plan may include the longitudinal axis L and the vertical axis V. The bus structure 26 may include two symmetric portions. For the sake of conciseness, the following description will be carried out in relation with one of said two portions, however it could apply to the both. Consequently, elements from one side may be duplicated.

The bus structure 26 in accordance with the current preferred embodiment of the invention is substantially similar to the one in accordance with FIG. 3. It substantially differs in that the strut 60 may comprise a curved strut 72, optionally a side curved strut 76. The side curved strut 76 may replace the lower strut and the upper strut.

The curved strut 72 may project over a majority of the height of the passenger compartment 48.

The curved strut 72 may, exhibit a profile and a centre line along which the profile is repeated. The centre line may be curved, and may comprise a radius ranging from: 1 m to 100 m, or 2 m to 20 m, or 3 m to 10 m.

The bus structure 26 includes a passenger compartment 48, a side wall 14 with a vertical post 34 and delimiting the passenger compartment 48, a horizontal support 42, a vertical handle 50 along the vertical post 34 and projecting from the horizontal support 42, a strut 60 projecting from the vertical post 34 to the horizontal support 42.

More specifically, the side curved strut 76 may be fixed to the vertical post 34 and may project from the roof structure 30 to the wheel housing 18, optionally between a first and a second transversal beam 52 of the horizontal support 42. The upper end of the side curved strut 76 may be fixed to the upper transversal beam 54, whereas the lower end thereof may be fixed to the lower transversal beam 56. The side curved strut 76 may project over the whole height of the rectangular loop R. Its convex side may face the side wall 14, and its concave side may face the longitudinal axis L, and optionally the floor structure 32. This may be generalized to the curved strut 72.

By way of consequence, the side curved strut 76 transmits efforts of wheel 8 to the roof structure 30. It also reduces bending and twisting of the bus structure 26.

In an alternative embodiment represented on the left side of FIG. 7, the vertical handle 50 may project from the longitudinal beam 44, optionally forming the wheel housing 1$. The side curved strut 76 may project from the reinforcement beam 70.

In the embodiments of FIGS. 3 to 7, only a pair of vertical handles 50 is represented longitudinally level with the vertical posts 34. However, the current view may be duplicated for each vertical post 34 as mentioned in relation with FIG. 2. Thus, a pair of vertical handles 50 and a pair of struts 60 (a pair of lower struts 62 and a pair of upper struts 64) may be associated with each of the vertical posts 34 as taught in connection with FIG. 2. Thus, it could be understood that each of FIGS. 3 to 7 substantially forms a transversal cut-out through each of the vertical posts 34 of FIG. 2. Then, seat places may be arranged between the struts 60, optionally between the lower struts 62. Seats may be fixed or in contact of said lower struts 62.

At least one or each of: the beams, the posts, the bars, the links, and the rods: form elongated portions. In the context of a bus structure, it may be understood that where an elongated portion projects from another one means that these two elongated portions are fixed to each other, optionally directly, at the location where they meet. Each elongated portion may be integrally formed. However, it is encompassed in the invention that these elongated portions may be formed by elongated elements and hubs with branches prolonging the elongated elements. Thus, the ends of the elongated elements may be at distance from the ends of neighbouring elongated elements. It should be understood that the detailed description of specific preferred embodiments is given by way of illustration only, since various changes and modifications within the scope of the invention will be apparent to the person skilled in the art. The scope of protection is defined by the following set of claims.

The invention claimed is:

1. A bus structure, comprising:
   a passenger compartment;
   a side wall including a vertical post, said vertical post delimiting the passenger compartment;
   a horizontal support;
   a vertical handle being transversely spaced from the vertical post and projecting from the horizontal support;
   a strut projecting from the vertical post to the horizontal support;
   a main longitudinal beam in a roof structure in an upper half of the bus structure; and
   a floor structure including longitudinal beams, wherein the main longitudinal beam is thicker than each of the longitudinal beams of the floor structure of the bus structure.

2. The bus structure in accordance with claim 1, wherein the horizontal support, the vertical post and the vertical handle cooperate to define a rectangular loop including at least one corner, the strut substantially defining a triangle at the corner of said rectangular loop.

3. The bus structure in accordance with claim 1, wherein the strut includes a curved strut and an upper end fixed to the horizontal support.

4. The bus structure in accordance with claim 3, wherein the side wall is a first side wall and the vertical post is a first vertical post, said bus structure further including a second side wall with a second vertical post and delimiting the passenger compartment, the curved strut transversally projecting from said second vertical post.

5. The bus structure in accordance with claim 1, wherein the horizontal support is a first horizontal support, the bus structure further including a second horizontal support from which the vertical handle projects.

6. The bus structure in accordance with claim 1, wherein the horizontal support is a lower horizontal support, said bus structure further including an upper horizontal support, and the strut is a lower strut projecting from the lower horizontal support, the bus structure further including an upper strut which projects from the upper horizontal support to the vertical post and which is over the lower horizontal support.

7. The bus structure in accordance with claim 1, wherein the strut is vertically level with the vertical handle and the vertical post, and wherein said strut is transversally disposed between the vertical handle and the vertical post.

8. The bus structure in accordance with claim 1, wherein the vertical handle is welded or glued to the horizontal support, and/or the strut is welded or glued to the vertical post, wherein the horizontal support is welded or glued to the vertical post, and wherein the strut is welded or glued to the horizontal support.

9. The bus structure in accordance with claim 1, wherein the vertical handle defines a thickness T1 and the strut defines a thickness T2, wherein T2/T1 equals 1.5 to 2.5, wherein the horizontal support defines a thickness T3, on said horizontal support, and wherein a transversal distance between the vertical handle and the strut is less than the thickness T3.

10. The bus structure in accordance with claim 1, further comprising at least one transversal bar projecting from the vertical post to the vertical handle, and from the strut to the vertical post, and the strut is inclined with respect to the vertical post of an angle ranging from 20° to 70°.

11. The bus structure in accordance with claim 1, further comprising a wheel housing, wherein the horizontal support includes a reinforcement beam at a top of the wheel housing, wherein said wheel housing extends over the whole length of said reinforcement beam, and wherein the strut projects from said reinforcement beam.

12. The bus structure in accordance with claim 1, further comprising a wheel housing, wherein the horizontal support includes a transversal beam transversally extending over all of the wheel housing, and wherein the strut and the vertical handle project from said transversal beam.

13. The bus structure in accordance with claim 12, wherein said transversal beam forms the wheel housing and transversally extends along a whole transversal width of said wheel housing, the wheel housing including a biased bar which is spaced from the strut, and wherein the bus structure includes an upper half in which the strut is enclosed.

14. A bus structure, comprising:
a passenger compartment;
a side wall including a vertical post, said vertical post delimiting the passenger compartment;
a wheel housing including a horizontal support;
a vertical handle being transversely spaced from the vertical post and projecting from the horizontal support of the wheel housing;
a strut linking the vertical post to the horizontal support of wheel housing;
a main longitudinal beam in a roof structure in an upper half of the bus structure; and
a floor structure including longitudinal beams, wherein the main longitudinal beam is thicker than each of the longitudinal beams of the floor structure of the bus structure.

15. A bus, comprising:
a passenger compartment;
at least forty seat places;
at least one wheel; and
a bus structure, said bus structure including:
a horizontal support,
a side wall including a vertical post which delimits the passenger compartment and which vertically extends from the horizontal support,
a vertical handle being transversely spaced from the vertical post and extending from the horizontal support,
a strut projecting from the vertical post toward the horizontal support,
a main longitudinal beam in a roof structure in an upper half of the bus structure, and
a floor structure including longitudinal beams, wherein the main longitudinal beam is thicker than each of the longitudinal beams of the floor structure of the bus structure.

16. The bus in accordance with claim 15, wherein the horizontal support extends over the wheel and above the at least forty seat places.

17. The bus in accordance with claim 15, wherein the strut is disposed longitudinally along the wheel.

18. The bus in accordance with claim 15, wherein the wheel defines a transversal width, and wherein the strut extends along a whole transversal width of the wheel.

19. The bus in accordance with claim 15, wherein the at least forty seat places comprise a longitudinal row of seat places which includes two adjacent seat places, and wherein the strut is longitudinally disposed between said two adjacent seat places.

* * * * *